UNITED STATES PATENT OFFICE.

PETER A. BELL, OF GRAND LEDGE, MICHIGAN.

IMPROVEMENT IN COMPOSITE ROOFING.

Specification forming part of Letters Patent No. 221,502, dated November 11, 1879; application filed September 2, 1879.

*To all whom it may concern:*

Be it known that I, PETER A. BELL, of Grand Ledge, in the county of Eaton and State of Michigan, have invented a new and useful Compound called "Composition Roofing," which compound is fully described in the following specification.

The nature of my invention relates to certain new and useful improvements in that class of roofs for buildings usually termed "cement" roofs, by means of which a certain elasticity is obtained, and a firmness which is not affected by the extreme cold of winter or excessive heat of summer, by which the roof is made fire-proof, and a color given thereto resembling that of dark-green slate.

The invention consists in the ingredients, in the proportions and compounding, substantially as herein described.

I take three parts of coal-tar, which I bring to a boil in a suitable kettle, and then add one part of broken asphalt, which melts in the boiling tar. I then add, as a drier and for the purpose of rendering the compound fire-proof when laid, six quarts of slaked lime or Akron cement, two pounds of whiting, and four pounds of rock-salt. For the purpose of giving the compound, when laid, the color and general appearance of dark-green slate, I add two pounds of Venetian red and two pounds of yellow ocher, which pigments are also non-combustible.

This compound is applied to roofs the covering of which are either metal, paper, or shingles, in a highly-heated condition, with a brush, somewhat as paint is laid on.

Before the compound is used two and one-half pounds of gum-shellac, with two pounds of alum, are melted therein, by which elasticity and a smooth polish are obtained.

When laid on, this compound will harden quickly, preserving a somewhat elastic condition, and will not run under the heat of the sun or become friable under extreme cold.

What I claim as my invention is—

A roofing compound composed of coal-tar and asphalt as a body, slaked lime or Akron cement, whiting, and rock-salt as a drier, and Venetian red and ocher as pigments, said drier and the pigments making the compound fire-proof, with or without shellac and alum, substantially as described.

PETER A. BELL.

Witnesses:
A. BARTHEL,
H. S. SPRAGUE.